US007761556B2

(12) United States Patent
Mills (10) Patent No.: US 7,761,556 B2
(45) Date of Patent: Jul. 20, 2010

(54) PERFORMANCE MONITORING WITHIN AN ENTERPRISE SOFTWARE SYSTEM

(75) Inventor: Michael C. Mills, Maple Grove, MN (US)

(73) Assignee: International Business Machines Corporation, Armonk, NY (US)

( * ) Notice: Subject to any disclaimer, the term of this patent is extended or adjusted under 35 U.S.C. 154(b) by 1054 days.

(21) Appl. No.: 10/996,856

(22) Filed: Nov. 22, 2004

(65) Prior Publication Data

US 2006/0136582 A1    Jun. 22, 2006

(51) Int. Cl.
*G06F 15/173* (2006.01)
*G06F 15/16* (2006.01)

(52) U.S. Cl. ........................... 709/224; 709/246
(58) Field of Classification Search ............... 709/317, 709/224, 246; 708/105; 705/51, 7, 10, 11
See application file for complete search history.

(56) References Cited

U.S. PATENT DOCUMENTS

| | | | | |
|---|---|---|---|---|
| 6,697,964 | B1 * | 2/2004 | Dodrill et al. ............... | 714/38 |
| 6,754,664 | B1 * | 6/2004 | Bush .......................... | 707/102 |
| 7,209,898 | B2 * | 4/2007 | Pfeiffer et al. .............. | 705/51 |
| 2002/0087516 | A1 * | 7/2002 | Cras et al. ................... | 707/2 |
| 2002/0169860 | A1 * | 11/2002 | Duggan et al. .............. | 709/223 |
| 2003/0204644 | A1 * | 10/2003 | Vincent ...................... | 709/317 |
| 2004/0003388 | A1 * | 1/2004 | Jacquemot et al. .......... | 717/174 |
| 2004/0064327 | A1 | 4/2004 | Humenansky et al. | |
| 2004/0064527 | A1 * | 4/2004 | Brunet et al. ............... | 709/218 |
| 2004/0064552 | A1 * | 4/2004 | Chong et al. ............... | 709/224 |
| 2004/0083246 | A1 * | 4/2004 | Kahlouche et al. .......... | 708/105 |
| 2004/0138903 | A1 * | 7/2004 | Zuniga ........................ | 705/1 |
| 2004/0249937 | A1 * | 12/2004 | Tachihara et al. ........... | 709/224 |
| 2005/0043986 | A1 * | 2/2005 | McConnell et al. ......... | 705/11 |
| 2005/0114435 | A1 * | 5/2005 | DiPlacido et al. ........... | 709/202 |
| 2005/0125213 | A1 * | 6/2005 | Chen et al. .................. | 703/22 |
| 2007/0198291 | A1 * | 8/2007 | Pfeiffer et al. .............. | 705/1 |

FOREIGN PATENT DOCUMENTS

WO    WO 2004/029898 A2    4/2004
WO    WO2005/022351 A2    3/2005

OTHER PUBLICATIONS

The International Search Report and Written Opinion from Corresponding PCT Application Serial No. PCT/IB2005/004106 mailed Jul. 25, 2006 (16 pages).

(Continued)

*Primary Examiner*—Joseph Thomas
*Assistant Examiner*—Tae K Kim
(74) *Attorney, Agent, or Firm*—Shumaker & Sieffert, P.A.

(57) ABSTRACT

A large-scale enterprise system is described that includes a flexible and scalable performance monitoring software. The system comprises a plurality of enterprise software applications having one or more collector components that collect performance data from the enterprise software applications. A performance manager receives the performance data from the collector components and aggregates the performance data within a hierarchical data structure. A performance manager interface receives the performance data from performance manager and formats the data for communication to a performance monitoring tool for presentment to a user.

17 Claims, 5 Drawing Sheets

OTHER PUBLICATIONS

International Preliminary Report on Patentability from corresponding PCT Application Serial No. PCT/IB2005/004106 mailed May 31, 2007 (11 pages).

Supplemental European Search Report dated Mar. 7, 2008 from corresponding European Application No. 05850794.8-2224 (5 pages).

Chinese Office Action from corresponding Chinese Application Serial No. 2005800398677, dated Jul. 25, 2008 (received in our office from our foreign associate on Nov. 18, 2008) (10 pages).

Office Action from corresponding Australian Application Serial No. 2005310976 dated Aug. 22, 2008 (2 pages).

* cited by examiner

PERFORMANCE MONITORING WITHIN AN ENTERPRISE SOFTWARE SYSTEM

TECHNICAL FIELD

The invention relates to software systems and, in particular, techniques for monitoring performance of an enterprise software system.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligent tools, enterprise reporting tools, project and resource management systems and other enterprise software systems.

Many computing platforms include software tools for monitoring current system performance. A performance monitoring tool may, for example, provide information describing processor utilizations, idle processor cycles and other general information. In addition, the performance monitoring utility often supports mechanisms for presenting application-specific information. For example, some conventional performance monitoring utilities allow a user to define and configure counters or timers for capturing specific performance data.

Conventional performance monitoring tools, however, are often complicated and difficult to use. One such software tool, for example, is Performance Monitor™ from Microsoft Corporation of Redmond, Wash. This performance monitoring tool requires strict compliance with a complex data format when providing system performance data to the utility. Moreover, Performance Monitor is generally designed to communicate with software modules written in the C++ programming language. Consequently, it is often difficult to format and provide the data from software modules written in other languages. For these and other reasons, it is often difficult to utilize performance monitoring tools with an enterprise software system, which may involve many cooperating software applications supporting many users.

SUMMARY

In general, the invention is directed to techniques for capturing performance data from a software system, such as large-scale, enterprise software systems. For example, techniques are described for easily capturing and aggregating performance data from multiple software applications within an enterprise software system.

The techniques allow a user to easily specify configuration information using a data description language, such as the extensible markup language (XML). A performance manager coordinates the capture and aggregation of performance data from the multiple enterprise software applications in accordance with configuration information. Based on the configuration information, the performance manager serializes the aggregated performance data and provides the aggregated performance data to a performance manager interface, which may be specific to a third-party performance monitoring tool. In turn, the performance manager interface generates formatted performance data that complies with requirements of the performance monitoring tool, and communicates the formatted performance data to the performance monitoring tool for presentment to the user.

The techniques may allow the user to more easily incorporate performance monitoring into an enterprise software system. For example, the user may generically define the configuration information for the performance manager without regard to the complex data format required by the particular third-party performance monitoring tool being utilized. Moreover, the described performance manager provides a central repository for aggregating performance data from one or more enterprise software applications. In this manner, the performance manager and the performance manager interface may collect the performance data from multiple enterprise software applications, and package the performance data based on the specific requirements of the third-party performance monitoring tool utilized to display the performance data.

In one embodiment, a system comprises a plurality of enterprise software applications having one or more collector components that collect performance data from the enterprise software applications. A performance manager receives the performance data from the collector components and aggregates the performance data within a hierarchical data structure. A performance manager interface receives the performance data from the performance manager and formats the data for communication to a performance monitoring tool for presentment to a user.

In another embodiment, a method comprises executing a plurality of enterprise software applications on a computing device, wherein the enterprise software applications have one or more collector components that collect performance data from the enterprise software applications. The method further comprises communicating performance data from the collector components to a performance manager, aggregating the performance data within the performance manager, and communicating the aggregated performance data to a performance manager interface. The method further comprises formatting the aggregated performance data in accordance with requirements of a performance monitoring software tool, and communicating the formatted performance data to the performance monitoring tool for presentment to a user.

In another embodiment, a computer-readable medium comprises instructions to cause a processor to execute a plurality of enterprise software applications on a computing device, wherein the enterprise software applications have one or more collector components that collect performance data from the enterprise software applications. The instructions further cause the processor to communicate performance data from the collector components to a performance manager, aggregate the performance data within the performance manager, and communicate the aggregated performance data to a performance manager interface. In addition, the instructions cause the processor to format the aggregated performance data in accordance with requirements of a performance monitoring software tool, and communicate the formatted performance data to the performance monitoring tool for presentment to a user.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
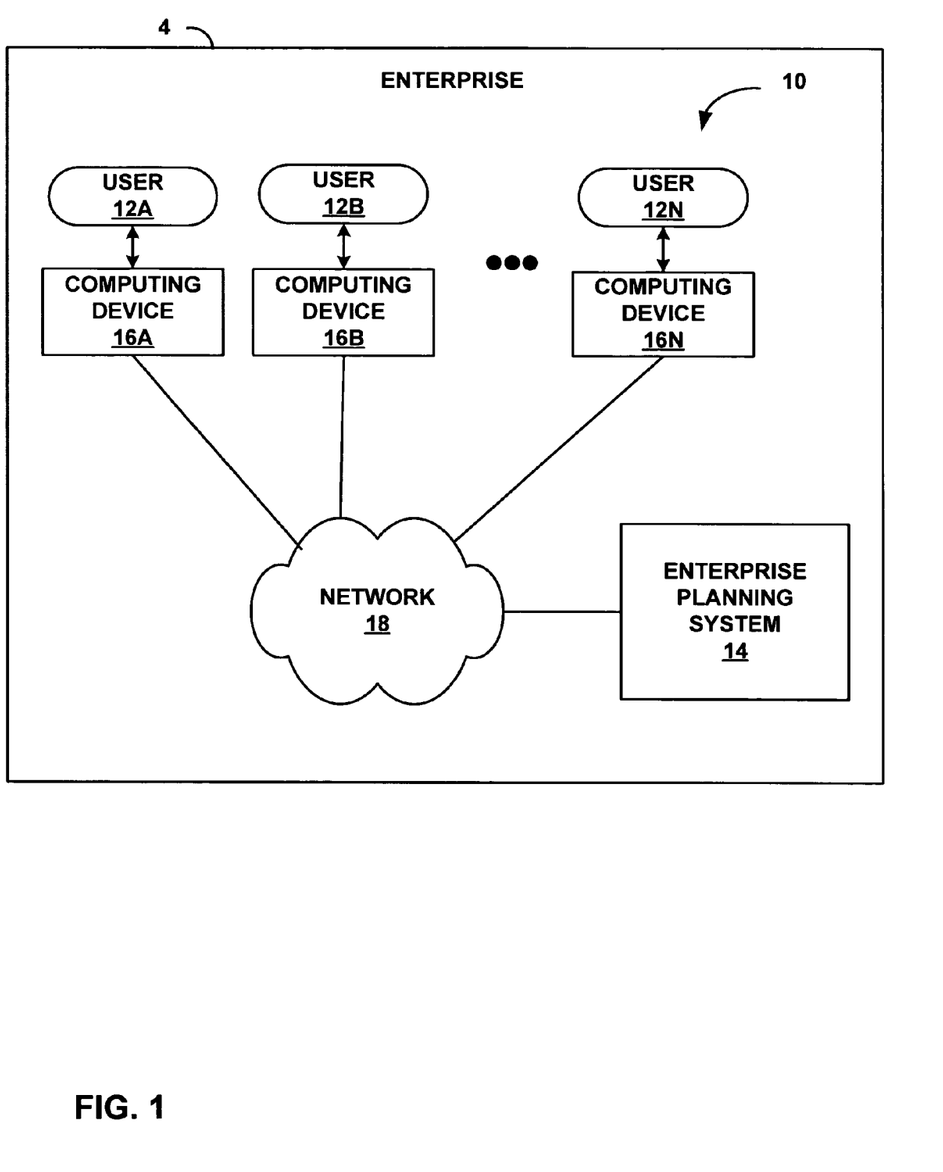
FIG. 1 is a block diagram illustrating an example computing environment in which a plurality of users interact with an enterprise planning system that enables and automates the reconciliation of top-down targets with detailed bottom-up forecasts.

FIG. 1 is a block diagram illustrating an example enterprise 4 having a computing environment 10 in which a plurality of users 12A-12N (collectively, "users 12") interact with an enterprise planning system 14. In the system shown in FIG. 1, enterprise system 14 is communicatively coupled to a number of computing devices 16A-16E (collectively, "computing devices 16") by a network 18. Users 12 interact with their respective computing devices 16 to access enterprise planning system 14.

For exemplary purposes, the invention is described in reference to an enterprise planning system, such as an enterprise financial or budget planning system. The techniques described herein may be readily applied other software systems, including other large-scale enterprise software systems. Examples of other enterprise software systems include order management systems, inventory management systems, sales force management systems, business intelligent tools, enterprise reporting tools, project and resource management systems and other enterprise software systems.

In general, enterprise planning system 14 enables and automates the reconciliation of top-down targets with detailed bottom-up forecasts for an enterprise. Enterprise planning system 14 implements and manages an enterprise planning process, which generally consists of three functions: (1) modeling, (2) contribution and (3) reconciliation.

Initially, high-level enterprise managers or executives, referred to as analysts, define organizational targets and build planning models for the enterprise. The analysts may include, for example, financial analysts, such as the chief financial officer, senior financial analysts or product and sales analysts. More specifically, the analysts develop a model having a number of hierarchically arranged nodes representing various cost centers within the organization, such as business units or departments. The analysts then specify corporate target data for each node of the organizational hierarchy. Corporate target data may include financial data, revenue data, order data, inventory data, and the like, depending on the particular enterprise planning activity being carried out by the enterprise. The analysts then assign one or more enterprise users 12 to each node, such as managers, supervisors, sales representatives, lab managers, or the like, that are responsible for enterprise planning for the cost center corresponding to the node. Each enterprise user 12 may be designated as a contributor that provides planning data to enterprise planning system 14, a reviewer that accepts or rejects contributions from the contributors, or both. The contributors and reviewers may be authorized users within the enterprise or within other entities coupled to network 18, such as suppliers or customers.

The enterprise users 12 that are designated as contributors interact with enterprise planning system 14 to input detailed forecasts in the form of contribution data. As described above, enterprise users 12 may provide detailed financial forecasts, revenue forecasts, order forecasts, inventory forecasts, estimated resource requirements, and the like, depending on the particular enterprise planning activity being carried out by the enterprise.

Enterprise planning system 14 automates the reconciliation of the forecast data with the corporate target data provided by the analysts. In particular, enterprise planning system 14 operates in accordance with a defined model, i.e., the enterprise planning model created by the analysts, to provide a hierarchical planning process having multiple reconciliation levels. As each of the contributors provides his or her contribution data (referred to generally, as "enterprise data"), enterprise planning system 14 automatically aggregates the contribution data across the enterprise in real-time, and provides access to the aggregated data to enterprise users 12 designated as reviewers associated with higher levels of the enterprise. In particular, upon receiving contribution data from the contributors, enterprise planning system 14 identifies all higher levels of the organizational model affected by the newly received contribution data, and calculates new aggregate totals at each level in real-time.

Consequently, the reviewers view aggregated data across the enterprise in real-time during the enterprise planning session. At each level, enterprise planning system 14 ensures that the reviewers, as defined by the nodes of the enterprise model, reconcile the target data with the forecast data. Each of the reviewers may, for example, reject or accept the contribution data in view of corporate targets provided by the analysts. This process continues until the contribution data is ultimately approved by the highest level of the organizational hierarchy, thereby ensuring that the contribution data from the contributors reconciles with corporate targets provided by the analysts.

In this manner, enterprise planning system 14 may provide more accurate enterprise planning than with conventional techniques. For example, enterprise planning system 14 may improve the accuracy and predictability of enterprise planning by enabling organizations to reconcile corporate models and organizational targets with detailed forecasts. The techniques may provide a platform that delivers collaborative, real-time planning capabilities, without requiring offline consolidation and aggregation of forecasts. Because enterprise planning system 14 can aggregate contribution data in real-time, all users 12 can be presented with an accurate, up-to-date view of the numbers. Further, the architecture of enterprise planning system 14 can readily scale to thousands of users, and may be designed around best planning practices. In addition, the techniques enable high participation by enterprise users 12, i.e., the contributors and reviewers, allowing accurate planning cycles to be reduced.

Enterprise users 12 may use a variety of computing devices to interact with enterprise planning system 14 via network 18. For example, an enterprise user may interact with enterprise planning system 14 using a laptop computer, desktop computer, or the like, running a web browser, such as Internet Explorer™ from Microsoft Corporation of Redmond, Wash. Alternatively, an enterprise user may use a personal digital assistant (PDA), such as a Palm™ organizer from Palm Inc. of Santa Clara, Calif., a web-enabled cellular phone, or similar device.

Network 18 represents any communication network, such as a packet-based digital network like the Internet. In this manner, system 10 can readily scale to suit large enterprises. Enterprise users 12 may directly access enterprise planning system 14 via a local area network, or may remotely access enterprise planning system 14 via a virtual private network, remote dial-up, or similar remote access communication mechanism.

Enterprise planning system 14 may utilize a "cut-down" process by which the multidimensional data store is "sliced" for each user 12 in accordance with the defined enterprise model. During this process, enterprise planning system 14 identifies areas of the defined model to which users 12 are assigned, either as contributors or reviewers, and "slices" the data store based on the assignments. When a given user 12 logs in and proceeds with an enterprise planning activity, enterprise planning system 14 communicates the respective data slice to the respective computing device 16 for display to the user via the extended spreadsheet application. In this fashion, enterprise planning system 14 need not communicate the entire model to each of users 12, thereby reducing communication time as well as resource requirements. Instead, each user 12 receives only relevant information. Users 12 interact with computing devices 16 to capture contribution data, and to reconcile the contribution data with organizational targets.

As described herein, any of computing devices 16 and/or enterprise planning system 14 may include a performance manager that collects performance data from enterprise planning software applications. Specifically, the performance manager provides an application programming interface (API) for capturing the performance data from the enterprise planning applications, and acts as a central repository for aggregating the performance data.

When requested, the performance manager serializes the aggregated performance data (i.e., generates a stream of performance data) and communicates the aggregated performance data to a performance manager interface, which may be specific to a third-party performance monitoring tool. The performance manager interface generates formatted performance data that complies with requirements of the performance monitoring tool, and communicates the formatted performance data to the performance monitoring tool for presentment to the user.

As further described herein, the user may define configuration information for the performance manager without regard to the complex data format required by the particular third-party performance monitoring tool. As one example, the user may utilize a data description language, such as the extensible markup language (XML), to define a hierarchical data structure having objects, counters and instances for storing performance data from the various enterprise software applications. The performance manager aggregates the performance data from the enterprise software applications by storing the performance data within the hierarchical data structure, and the performance manager interface communicates the performance data to the third party monitoring tool in the required format. In this way, the user may more easily incorporate performance monitoring into computing environment 10 and enterprise software system 14.

Figure 2:
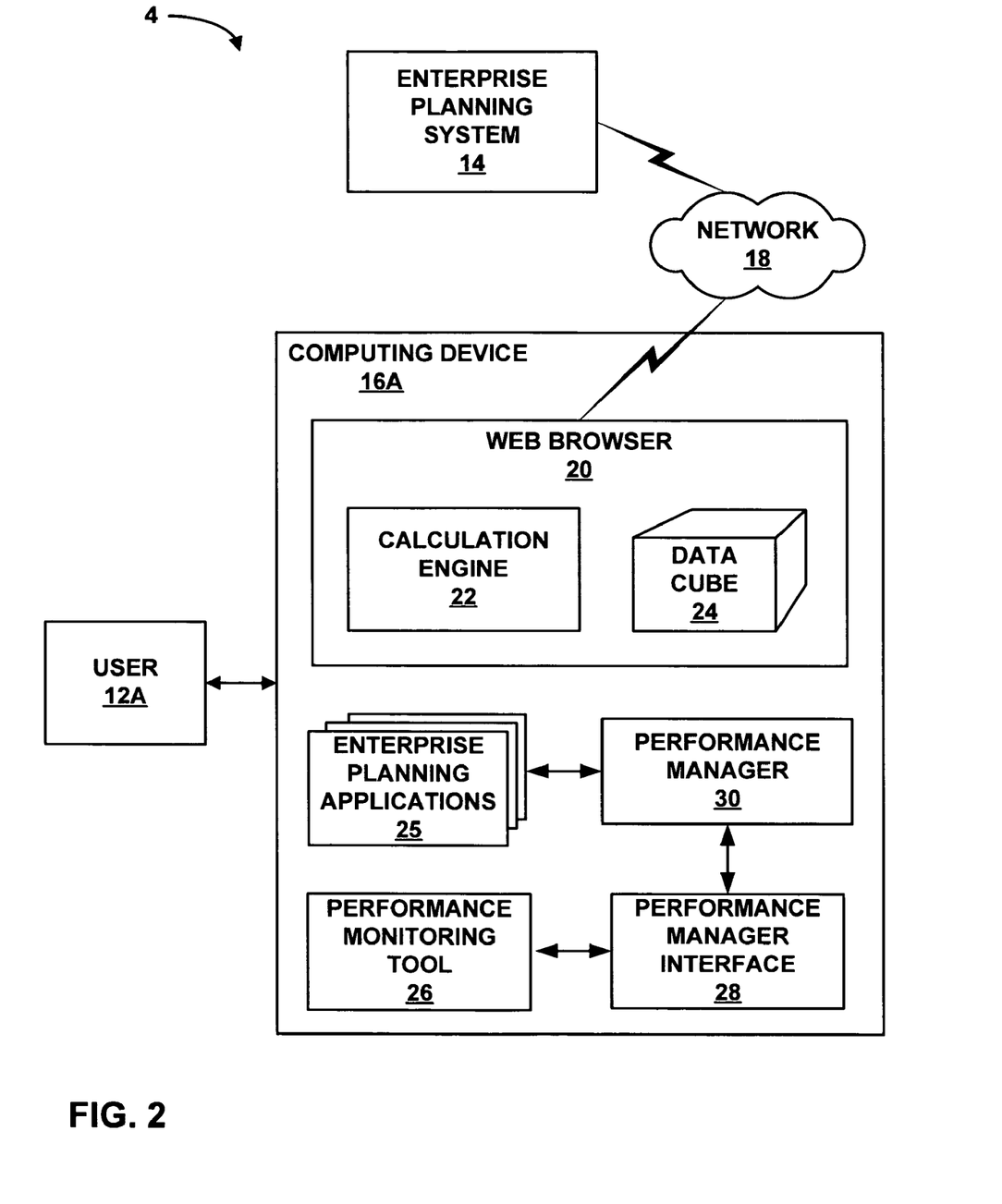
FIG. 2 is a block diagram illustrating one embodiment of a remote computing device for interacting with the enterprise planning system of FIG. 1.

FIG. 2 is a block diagram illustrating one embodiment of a computing device 16A, including various software modules executing thereon, when operated by a user 12A, such as a contributor or a reviewer. In the exemplary embodiment, computing device 16A includes web browser 20, calculation engine 22 and data cube 24. In addition, computing device 16A includes one or more enterprise planning applications 25, performance monitoring tool 26, performance manager interface 28 and performance manager 30.

In one embodiment, calculation engine 22 comprises a forward calculation engine 22 wrapped in an Active X object built in an array-based language. In the example of enterprise planning, user 12A may interact with web browser 20 to enter and manipulate budget or forecast data. Data cube 24 contains planning data, which may include top-down targets and bottom-up contribution data, and allows all calculations for an enterprise planning session to be performed locally by computing device 16A. Therefore, in this example, a contributor can modify his or her respective contribution data, and perform calculations necessary for the enterprise planning process without necessarily accessing enterprise planning system 14. In other words, calculation engine 22 and data cube 24 may be maintained locally (e.g., as ActiveX components) via computing device 16A. User 12A may save the planning data locally, and submit the planning data to enterprise planning systems 14 for aggregation with the planning data from other users. Enterprise planning system 14 automatically aggregates the contribution data across enterprise 4 in real-time, and provides access to the aggregated data to reviewers associated with higher levels of the enterprise. This process continues until the contribution data is ultimately approved by the reviewers associated with the highest level of the organizational hierarchy, thereby ensuring that the contribution data from the contributors reconciles with corporate targets. In other embodiments, calculation engine 22 and data cube 24 may be maintained at only at enterprise planning system 14 and installed locally upon computing devices 16.

Enterprise planning applications 25 represent software applications that may be utilized when carrying out the planning session on computing device 16A. Example applications include web browser applications, web services, calculation engines, reporting tools, modeling tools, spreadsheet applications, data collection templates, business intelligence tools or other types of enterprise planning applications.

Performance monitoring tool 26 represents a software utility for displaying performance data associated with the enterprise planning session. For example, performance monitoring tool 26 may be a third-party performance monitoring tool, such as Performance Monitor™ from Microsoft Corporation of Redmond, Wash. Performance monitoring tool 26 typically provides a graphical user interface for displaying the performance data, and may require that the performance data adhere to a complex data format.

Performance manager 30 collects performance data from enterprise planning applications 25. In this manner, performance manager 30 acts as a central repository for aggregating the performance data. When requested, performance manager 30 serializes the aggregated performance data and provides the serialized performance data to performance monitoring tool 26 via performance manager interface 28 in accordance with the particular data format required by the performance monitoring tool.

Figure 3:
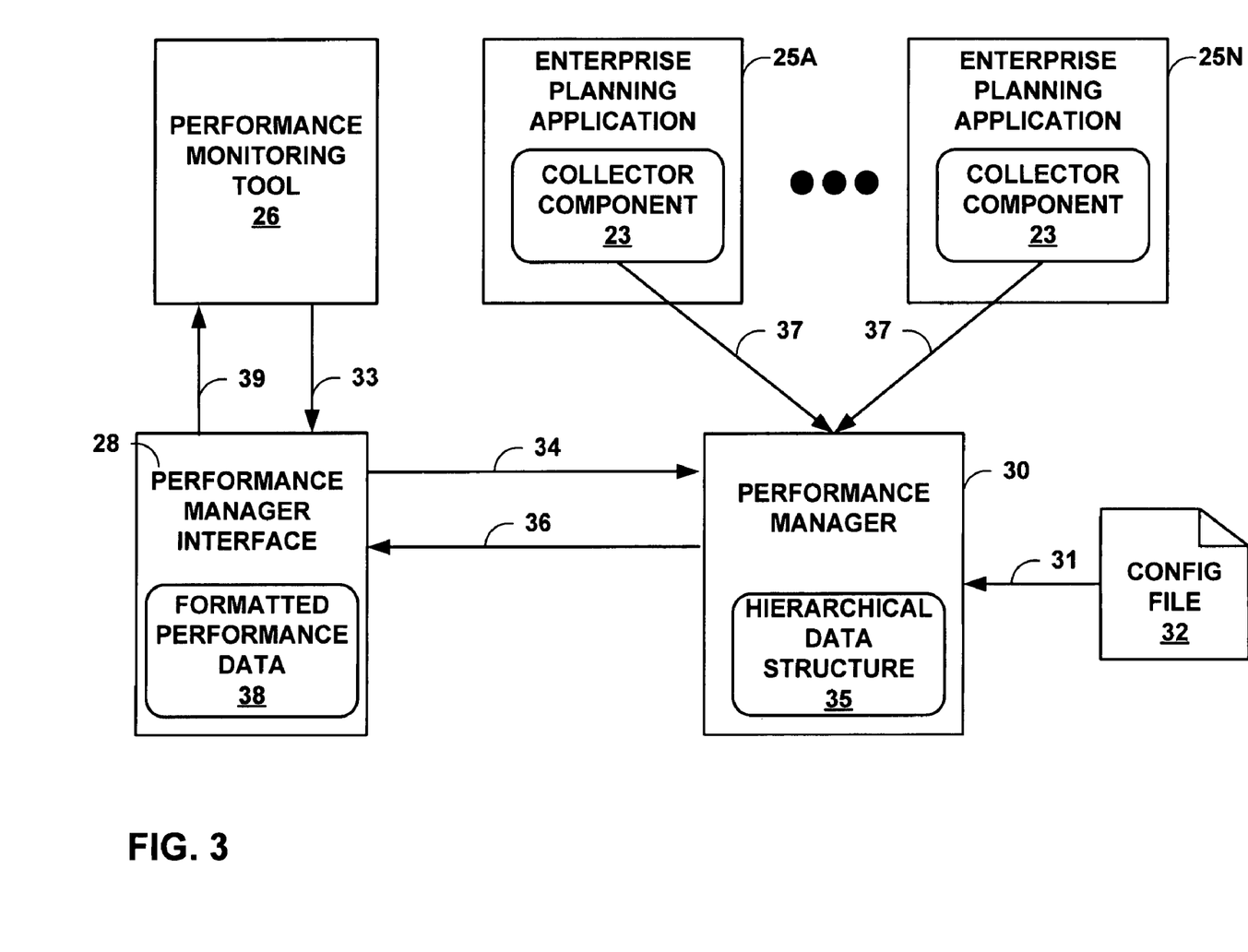
FIG. 3 is a block diagram that illustrates certain software components of the remote computing device in further detail.

FIG. 3 is a block diagram that illustrates portions of computing device 16A in further detail. As illustrated in FIG. 3, performance manager 30 reads configuration information 31 from configuration file ("CONFIG FILE") 32, which may be stored locally on computing device 16A or remotely at enterprise planning system 14.

In general, configuration information 31 utilizes a data description language, such as XML, to define a hierarchical data structure having, for example, objects, counters and instances for storing performance data from the various enterprise software applications. Performance manager 30 processes configuration file 32 and creates the hierarchical data structure 35 in memory in accordance with the definition specified within configuration file 32. Performance manager 30 receives performance data 37 from enterprise software applications 25A-25N, and aggregates the performance data by storing the performance data within hierarchical data structure 35. In some embodiments, performance manager may be implemented as a service having its own process space separate from enterprise planning applications 25 and performance monitoring tool 26.

Performance manager interface 28 provides an interface for communication between performance monitoring tool 26 and performance manager 30. Performance manager interface 28 may, for example, comprise a dynamic link library (DLL) that executes within the process space of performance monitoring tool 26 and exposes methods which may be invoked by performance monitoring tool 26. Performance manager interface 28 receives serialized performance data 36 from performance manager 30 (e.g., via inter-process message) and maintains formatted performance data 38 that conforms to the specific requirements and data formats unique to performance monitoring tool 26, which may be a third-party, platform-specific tool.

Figure 4:
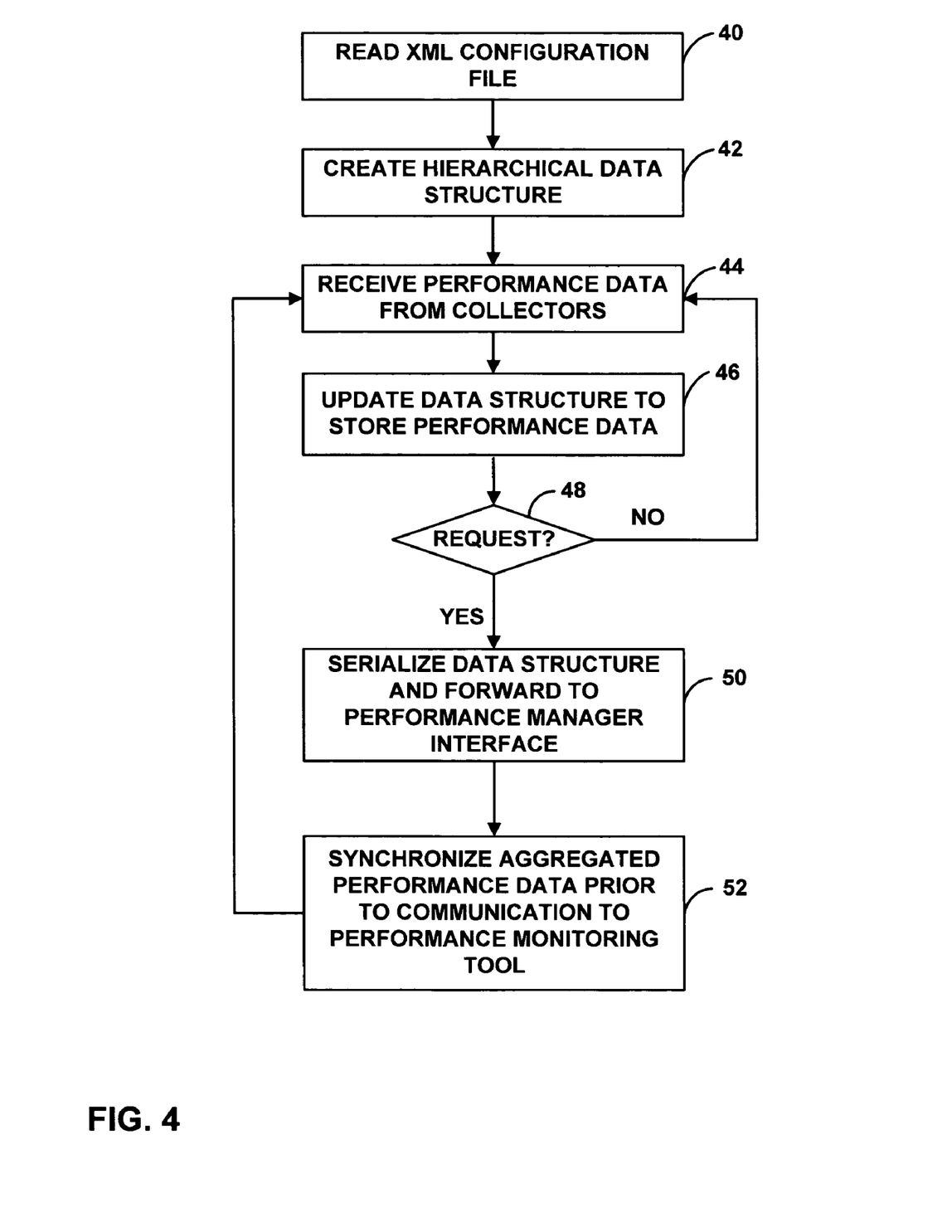
FIG. 4 is a flowchart that illustrates exemplary operation of software components executing on the remote computing device for collecting and reporting performance data.

FIG. 4 is a flowchart that illustrates exemplary operation of the software components illustrated in FIG. 3. Initially, performance manager 30 reads configuration information 31 from configuration file 32 and creates hierarchical data structure 35 as a repository for performance data 37 (40, 42). In some embodiments, configuration information 31 may include a logical switch to enable or disable performance monitoring. In other embodiments, a similar switch is stored in a registry or other location accessible by performance manager 30.

Next, assuming performance monitoring is enabled, performance manager 30 collects performance data 37 from enterprise planning applications 25 (44). In particular, enterprise planning applications 25 include one or more "collector" software components 23 that send performance data 37 to performance manager 30. Collector software components 23 may include, for example, counters or timers instantiated from classes associated with performance manager 30. Collector software components 23 maintain performance data 37 within the respective process space of enterprise planning applications 25, and communicate the performance data to performance manager 30.

For example, collector software components 23 may communicate the performance data as serialized data (e.g., via inter-process messages). As another example, collector software components 23 may communicate the data by function call (e.g., a cross-process function call that is serialized by an underlying operating system).

Upon receiving the performance data 37, performance manager 30 stores the performance data within hierarchical data structure 35 (46).

At any point in time, performance monitoring tool 26 may issue requests 33 to performance manager interface 28, which in turn issues requests 34 to performance manager 30 (48).

For example, performance monitoring tool 26 may issue an initial connection request to performance manager interface 28. In response, performance manager interface 28 issues an "OPEN" request to performance manager 30. In this case, performance manager 30 provides a complete serialized snapshot of the performance data stored within hierarchical data structure 35 (50). In one embodiment, performance manager interface 28 generates formatted performance data 38 as a binary block of data within the process space of performance monitoring tool 26. In particular, performance manager interface 28 may generate formatted performance data 38 as the binary data block that conforms to the specific requirements of performance monitoring tool 26.

Alternatively, performance monitoring tool 26 may periodically poll performance manager interface 28 for performance data. In this case, performance manager interface 28 issues request 34 in the form of a "COLLECT" request. In response, performance manager 30 again provides a serialized copy of the aggregated performance data stored within hierarchical data structure 35 (50). Performance manager interface 28 processes the serialized performance data 36 and automatically updates the previously created data block.

During this process, performance manager interface 28 may automatically synchronize the serialized aggregated performance data 36 with the previously created data block (52). For example, performance manager interface 28 may perform a synchronization between the instances and counters for which serialized performance data 36 was received from performance manager 30 (i.e., instances and counters currently utilized by enterprise planning applications 25) with the instances and counters present when performance monitoring tool 26 initially connected. In some embodiments, for example, performance monitoring tool 26 may be configured by the user to display fewer counters and instances than are actually available and used by enterprise planning applications 25. In other cases, new instances may be created after performance monitoring tool 26 was launched. In either case, performance manager interface 28 automatically detects the instances and counters for which serialized performance data 36 is received but that are not to be displayed. For these instances and counters, performance manager interface 28 automatically excludes the serialized performance data from formatted performance data 38.

In the situation where an instance or counter selected for display is no longer used by enterprise planning applications 25, performance manager interface 28 will not receive serialized performance data 37 for the inactive collection component 23. When no performance data is received for a particular collection component 23, performance manager interface 28 automatically resets the respective portion of formatted performance data 38. For example, performance manager interface 28 may automatically set a counter value to zero when generating formatted performance data 38 when performance data for that counter has not been received in a defined time period.

Performance manager interface 28 includes concurrency logic to handle threading concurrency. For example, performance manager interface 28 handles situations where multiple collector software components 23 attempt to set the same counters at the same time. Other examples that are handled include situations where collectors may collector software components 23 attempt to set counter values while performance manager 28 is serializing its data, reading configuration file 32 or removing timed-out instances.

Figure 5:
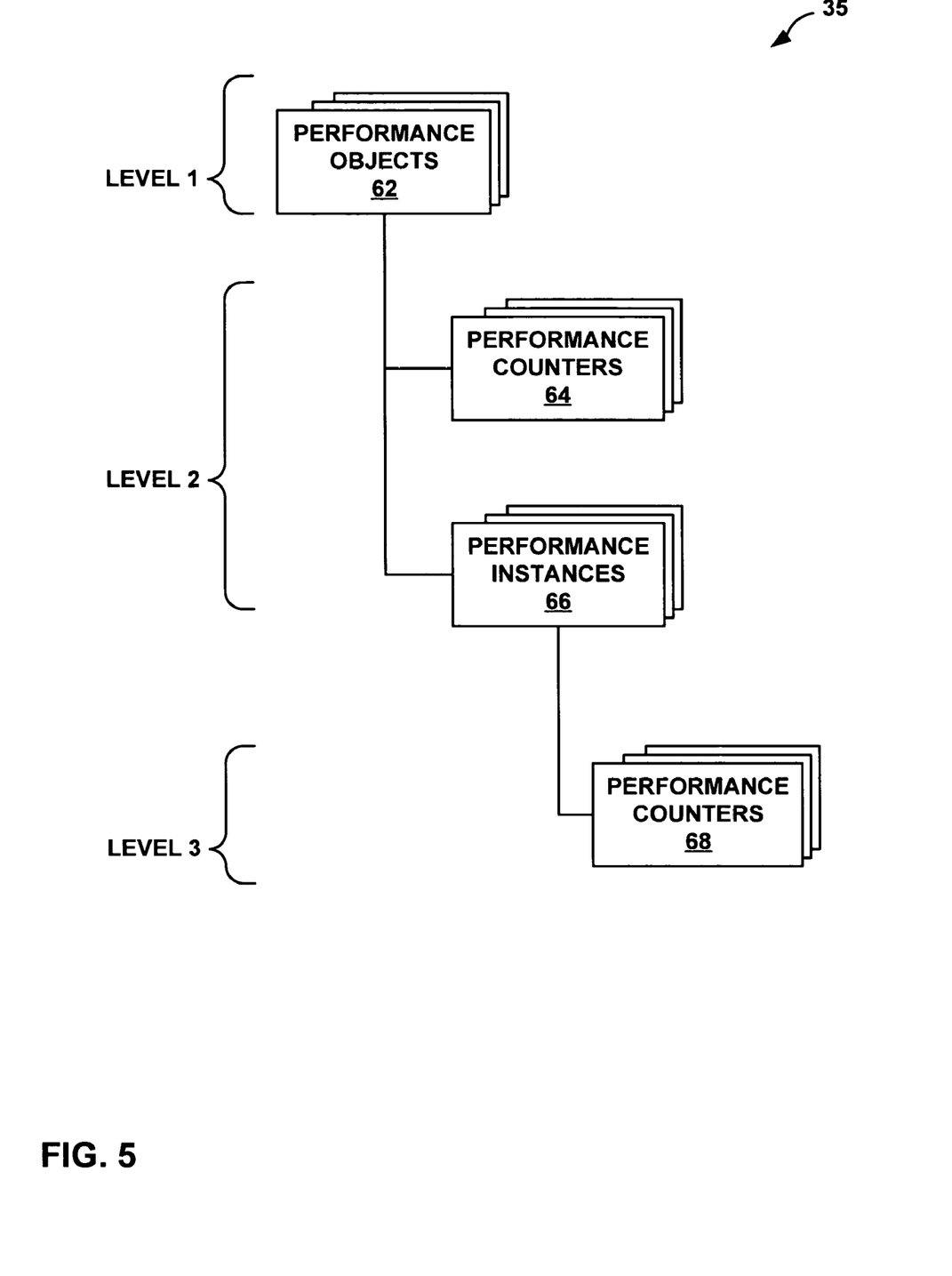
FIG. 5 is a block diagram illustrating an example organization of hierarchical data structure for storing performance data.

FIG. 5 is a block diagram illustrating an example organization of hierarchical data structure 35 for storing data from collector components 23. In the illustrated embodiment, hierarchical data structure 35 includes four classes organized into three levels (LEVEL 1, LEVEL 2 and LEVEL 3).

The highest level, LEVEL 1, includes the performance objects class 62. In this example, an object is essentially a group of counters. An object may have one or more instances, and instances are optional.

The second level, LEVEL 2, includes the performance counters class 64 and the performance instances class 66. The performance counters class 64 represents data structures for storing count data, which may be used within enterprise planning applications 25 to compute various performance data, including event counts, time periods, durations, averages, sums or other data. For example, two different types of counters include: (1) value counters that are used to report counts, and (2) timer counters that are used to report time durations.

The performance instances class 66 represents particular instantiations of performance objects class 62. Performance manager 30 provides mechanisms for automatically creating and totaling instances, which is a common requirement.

The third level, LEVEL 3, includes another representation of the performance counters class 68 as counters may be associated with objects or particular instances of objects. In this manner, counters can ultimately be reported by performance monitoring tool 26 generally by object or by specific instance.

In general, configuration information 31 may be written in the following XML form to specify a hierarchy for storing performance data:

```
<PerformanceData>
    <Object>
        <Counter />
        .
        .
        .
        <Counter />
    </Object>
    .
    .
    .
    <Object>
        <Counter />
        .
        .
        .
        <Counter />
    </Object>
</PerformanceData>
```

The following illustrates one example of configuration information 31 in XML form:

```
<?xml version="1.0" ?>
- <PerformanceData headerFile="EPCounters.h"
iniFile="EPCounters.ini"
perfmonDLLFile="epPerformanceDll.dll"
deviceName="epPlanningService_cer4"
instanceCleannupPolling="900">
    - <Object name="Planning Server" help="Planning Server"
    hasInstances="false"
    autoCreateInstanceTotal="false"
    autoCalcInstanceTotal="no_calc"
    instanceTimeout="900">
            <Counter name="Web
            Req Per Sec" help="Web Requests Per Second"
            defaultScale="0"
            counterType="PERF_COUNTER_DELTA" />
                <Counter name="Avg Web Resp Time
                (sec) " help="Avg Web Response Time"
                defaultScale="0"
                counterType="PERF_COUNTER_RAWCOUNT" />
            </Object>
    - <Object name="Planning Client"
    help="Planning Client" hasInstances="true"
    autoCreateInstanceTotal="true" autoCalcInstanceTotal="sum"
    instanceTimeout="900">
            <Counter name="Open Node Total" help="Total
            Time to open node"
            defaultScale="0"
            counterType="PERF_COUNTER_RAWCOUNT" />
                <Counter name="Avg Login Time" help="Avg
                login time" defaultScale="0"
                counterType="PERF_COUNTER_RAWCOUNT" />
            </Object>
    - <Object name="Planning Job Items" help="Planning Job
    Items" hasInstance Items"s="true"
    autoCreateInstanceTotal="true" autoCalcInstanceTotal="sum"
    instanceTimeout="900">
```

-continued

```
            <Counter name="Total" help="The number of
            job items processed (regardless of
            success or failure)." defaultScale="0"
        counterType="PERF_COUNTER_RAWCOUNT" />
                <Counter name="Succeeded" help="The
                number of job items that succeeded."
            defaultScale="0"
                counterType="PERF_COUNTER_RAWCOUNT" />
                <Counter name="Failed" help="The
                number of job items that failed."
            defaultScale="0"
                countertype="PERF_COUNTER_RAWCOUNT" />
    </Object>
</PerformanceData>
```

The above example configuration information 31 defines a single XML element PerformanceData. The PerformanceData element specifies certain attributes, including a header filer (EPCounters.h), an initialization file (EPCoutners.ini) and the name of a performance manager interface 28 (epPerformanceDLL.dll). The PerformanceData element also specifies an instanceCleannupPolling attribute that defines a clean-up timeout that controls how frequently performance manager 30 performs a clean-up on hierarchical data structure 35, and an instanceTimeout attribute that defines a timeout period for automatically removing an object instance that has not been updated with performance data.

The PerformanceData element contains XML elements defining three performance objects for storing performance data: Planning Server, Planning Client and Planning Job Items.

Each of these objects in turn contains XML elements defining one or more counters. For example, the Planning Server object specifies two counters: (1) Web Req Per Second for tracking the number of web requests received per second, and (2) Avg Web Resp Time for tracking the average response time per web request. The Planning Client object specifies two counters: (1) Open Node Total for counting the number of model nodes currently open on the client, and (2) Avg Login Time for computing the average time a user is logged into enterprise planning system 14. The Planning Job Items object specifies three counters: (1) Total for tracking the total number of job items processed, (2) Succeeded for tracking the total number of job items that succeeded, and (3) Failed for tracking the total number of job items that failed.

Each object element specifies a name attribute, a hasInstances attributes that indicates whether the object has specified instances, autoCreateInstanceTotal and autoCalcInstanceTotal attributes that determine whether the object automatically creates and maintains a total count for the number of instances created, and an instanceTimeout attribute that specifies a period for deleting the instance in the event the instance is not updated.

Each counter element specifies a name attribute, a help attribute that defines a help text string, a defaultScale attribute used to scale a count value maintained by the counter, and a counterType attribute that defines the type of counter to be created. In this example, counters containing raw counts are defined by specifying a counterType of PERF_COUNTER_RAWCOUNT.

In this manner, configuration file 32 may be an XML document that specifies the objects, instances and counters (i.e., collector components 23) that are utilized by enterprise software applications 25 to collect performance data at the enterprise software applications and relay the performance data to performance manager 30. Performance manager processes configuration file 32 to create hierarchical data structure 35 to collect and aggregate the performance data from enterprise software applications 25. For example, performance manager 30 creates hierarchical data structure 35 to allocate storage capacity that reflects the collector components 23 described in XML configuration file 32, and expects to receive performance data from corresponding collector components operating within enterprise planning applications 25. In the event performance data is not received for one or more of the collector components 23 within the defined time periods, performance manager 30 may automatically update hierarchical data structure 35 periodically to remove storage capacity allocated to the unused collector component.

As described above, when requested, performance manager 30 serializes hierarchical data structure 35 and provides serialized performance data 36 to performance manager interface 28. In turn, performance manager interface 28 generates formatted performance data 38 in accordance to the specific requirements of performance monitoring tool 26.

For example, when generating formatted performance data 38 for Performance Monitor from Microsoft Corporation, performance manager interface 28 generates formatted performance data 38 as a contiguous block of binary data that conforms to the particular requirements established by Microsoft. In this example, performance manager interface 28 generates formatted performance data 38 to include a fixed-length header structure that describes the performance data. Performance manager interface 28 generates formatted performance data 38 to further include a variable number of variable-length object data items. Performance manager interface 28 automatically generates the header of each object to contain an offset of the next object in the list, as is required by Microsoft.

Further, performance manager interface 28 generates each object within the binary block of data to conform to the required structure. Specifically, each object within the block of data is followed by a list of counter definition structures, one for each counter defined for the object. Performance manager interface 28 generates the block of binary data so that each counter definition structure contains the offset from the start of the structure to the corresponding counter data.

For an object type that supports multiple instances, the list of counter definition structures within formatted performance data 38 is followed by a list of instance information blocks (one for each instance), as required by Microsoft. Each instance information block contains an instance definition structure, the name of the instance, and a counter block structure. In this manner, performance manager interface 28 receives the serialized performance data from performance manager 30, and creates formatted performance data 38 as a block of binary data as required by Microsoft's Performance Monitor. Performance manager 30, however, need not conform to these requirements and can readily aggregate data from multiple enterprise planning applications 25.

Various embodiments of the invention have been described. Although described in reference to an enterprise planning system, such as an enterprise financial or budget planning system, the techniques may be readily applied to other software systems, including other large-scale enterprise software systems. Examples of other enterprise software systems include order management systems, inventory management systems, sales force management systems, business intelligent tools, enterprise reporting tools, project and resource management systems and other enterprise software systems. Moreover, the techniques may be implemented on any type of computing device, including servers, client computers, laptops or other devices. These and other embodiments are within the scope of the following claims.

The invention claimed is:

1. A method comprising:
   executing a plurality of enterprise software applications on at least one computing device, wherein the enterprise software applications have one or more collector components that collect performance data from the enterprise software applications;
   creating, by a performance manager in the at least one computing device, a hierarchical data structure in accordance with a single configuration file, wherein the configuration file provides a definition of the hierarchical data structure that is created for storing the performance data collected from all of the one or more collector components, wherein the configuration file defines the hierarchical data structure to include: (1) an object class specifying an object representing a group of one or more counters; (2) at least one instance class specifying at least one instance that is a particular instantiation of the object; and (3) at least one counters class specifying data structures for storing count data associated with the object class or the instance class that has been collected from the one or more collector components, and wherein the hierarchical data structure is defined without regard to a data format required by a third-party performance monitoring software tool that receives output data from the performance manager;
   communicating performance data from all of the one or more collector components to the performance manager;
   aggregating the performance data within the hierarchical data structure by the performance manager in the at least one computing device by executing mechanisms of the performance manager to automatically create the instances of the objects and automatically total the performance data for the instances of the objects in accordance with the hierarchical data structure specified by the configuration file;
   communicating, by the performance manager, the aggregated performance data as output to a performance manager interface, wherein the performance manager interface is specific and particular to the third-party performance monitoring software tool, the performance manager being executed in a separate process space from both the third-party performance monitoring software tool and from the performance manager interface;
   formatting, by the performance manager interface in the at least one computing device, the aggregated performance data to comply with a specific data format required by the third-party performance monitoring software tool; and
   communicating the formatted, aggregated performance data from the performance manger interface to the third-party performance monitoring software tool for presentment to a user, wherein the formatted, aggregated performance data complies with the specific data format required by the third-party performance monitoring software tool.

2. The method of claim 1, further comprising:
   defining the one or more collector components of the enterprise software applications in a data description language; and
   creating the hierarchical data structure with the performance manager to aggregate the performance data from the one or more collector components in accordance with the data description language.

3. The method of claim 1, further comprising providing the performance manager interface as a dynamic link library (DLL) executed within a process space of the third-party performance monitoring software tool.

4. The method of claim 1, further comprising:
receiving an initial connection request from the third-party performance monitoring software tool;
detecting performance data received from a collector component that was activated subsequent to the initial connection request; and
automatically excluding the detected performance data from the aggregated performance data communicated to the third-party performance monitoring software tool.

5. The method of claim 1, further comprising automatically resetting any of the aggregated performance data that has not been updated by the respective one of the collector components within a period of time.

6. The method of claim 1,
wherein communicating the performance data comprises communicating the performance data from the one or more collector components to the performance manager as serialized performance data, and
wherein communicating the aggregated performance data comprises communicating the aggregated performance data from the performance manager to the performance manager interface as serialized aggregated performance data.

7. The method of claim 1, wherein the one or more collector components include timer counters or value counters.

8. The method of claim 1, further comprising:
storing modeling data defining a plurality of nodes of an enterprise; and
storing enterprise planning data associated within each of the nodes;
executing an enterprise planning session with the enterprise software applications using the enterprise planning data; and
updating the one or more collector components with the performance data from the enterprise planning session.

9. A computer-implemented system comprising:
at least one computing device including a memory;
a plurality of enterprise software applications executable on the at least one computing device and having one or more collector components that collect performance data from the enterprise software applications;
a single configuration file that provides a definition of a hierarchical data structure that is to be created for storing the performance data collected from all of the one or more collector components;
a performance manager that is executed on the at least one computing device to:
create the hierarchical data structure within the memory of the at least one computing device, in accordance with the configuration file, to include: (1) an object class specifying an object representing a group of one or more counters; (2) at least one instance class specifying at least one instance that is a particular instantiation of the object; and (3) at least one counters class specifying data structures for storing count data associated with the object class or the instance class that has been collected from the one or more collector components, wherein the hierarchical data structure is defined without regard to a data format required by a third-party performance monitoring software tool that receives output data from the performance manager;
receive the performance data from all of the one or more collector components; and
aggregate the performance data within the hierarchical data structure, wherein the performance manager aggregates the performance data from the one or more collector components in accordance with a data description language, and wherein the performance manager includes mechanisms for automatically creating the instances and totaling the performance data for the instances within the hierarchical data structure as specified by the configuration file;
a performance manager interface that is specific and particular to the third-party performance monitoring software tool and that is executable on the at least one computing device to receive the performance data from performance manager and formats the aggregated performance data for communication from the performance manager interface to the third-party performance monitoring software tool for presentment to a user, wherein the formatted, aggregated performance data complies with a specific data format required by the third-party performance monitoring software tool; and
the performance manager being executed in a separate process separate from both the third-party performance monitoring software tool and from the performance manager interface.

10. The system of claim 9, wherein the data description language defines the one or more collector components to include a plurality of counters within the enterprise software applications.

11. The system of claim 9, wherein the performance manager interface comprises a dynamic link library (DLL) executed within a process space of the third-party performance monitoring software tool.

12. The system of claim 9,
wherein the performance manager interface detects performance data received from a collector component activated subsequent to an initial connection request from the third-party performance monitoring software tool, and
wherein the performance manager automatically excludes the detected performance data.

13. The system of claim 9, wherein the performance manager automatically resets the performance data associated with any of the one or more collector components when the respective aggregated performance data has not been updated within a period of time.

14. The system of claim 9,
wherein the one or more collector components communicate the performance data to the performance manager as serialized data and
wherein the performance manager communicates the aggregated performance data from the hierarchical data structure to the performance manager interface.

15. The system of claim 9, wherein the one or more collector components include timer counters or value counters.

16. The system of claim 9, further comprising:
a database system storing modeling data defining a plurality of nodes, and enterprise planning data associated within each of the nodes,
wherein the enterprise software applications comprise enterprise planning software applications that access the enterprise planning data and perform an enterprise planning session, and
wherein the enterprise software applications update the one or more collector components with performance data from the enterprise planning session.

17. A non-transitory computer readable storage medium comprising instructions that cause at least one computing device to:

- execute a plurality of enterprise software applications, wherein the enterprise software applications have one or more collector components that collect performance data from the enterprise software applications;
- create, by a performance manager, a hierarchical data structure in accordance with a single configuration file, wherein the configuration file provides a definition of the hierarchical data structure that is created for storing the performance data collected from all of the one or more collector components, wherein the configuration file defines the hierarchical data structure to include: (1) an object class specifying an object representing a group of one or more counters; (2) at least one instance class specifying at least one instance that is a particular instantiation of the object; and (3) at least one counters class specifying data structures for storing count data associated with the object class or the instance class that has been collected from the one or more collector components, and wherein the hierarchical data structure is defined without regard to a data format required by a third-party performance monitoring software tool that receives output data from the performance manager;
- communicate performance data from all of the one or more collector components to the performance manager;
- aggregate the performance data within the hierarchical data structure by the performance manager by executing mechanisms of the performance manager to automatically create the instances of the objects and automatically total the performance data for the instances of the objects in accordance with the hierarchical data structure specified by the configuration file;
- communicate, by the performance manager, the aggregated performance data to a performance manager interface, wherein the performance manager interface is specific and particular to the third-party performance monitoring software tool, the performance manager being executed in a separate process space from both the third-party performance monitoring software tool and from the performance manager interface;
- format, by the performance manager interface, the aggregated performance data to comply with a specific data format required by a third-party performance monitoring software tool; and
- communicate the formatted, aggregated performance data from the performance manager interface to the third-party performance monitoring software tool for presentment to a user, wherein the formatted, aggregated performance data complies with the specific data format required by the third-party performance monitoring software tool.

\* \* \* \* \*